G. W. MYERS & E. ADAMS.
Combined Folding Chairs and Benches.
No. 154,071. Patented Aug. 11, 1874.
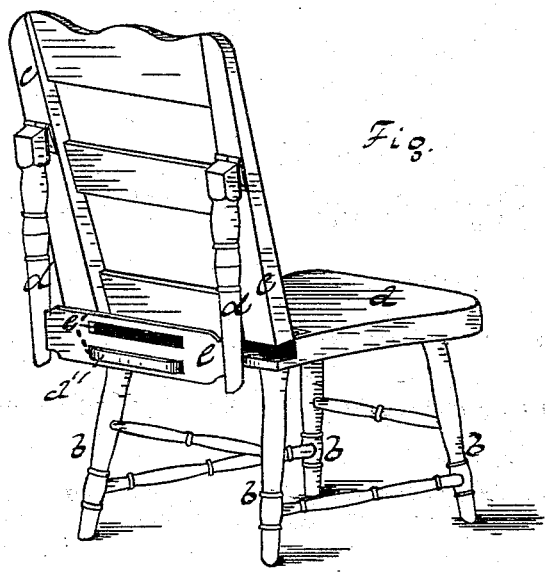
Fig.
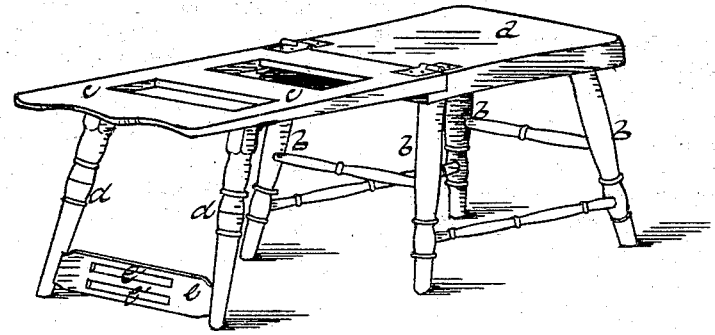
Fig 2.

3 Sheets--Sheet 1.
J. NORTH.
Direct Acting Steam-Pumps.
No.154,072. Patented Aug. 11, 1874.
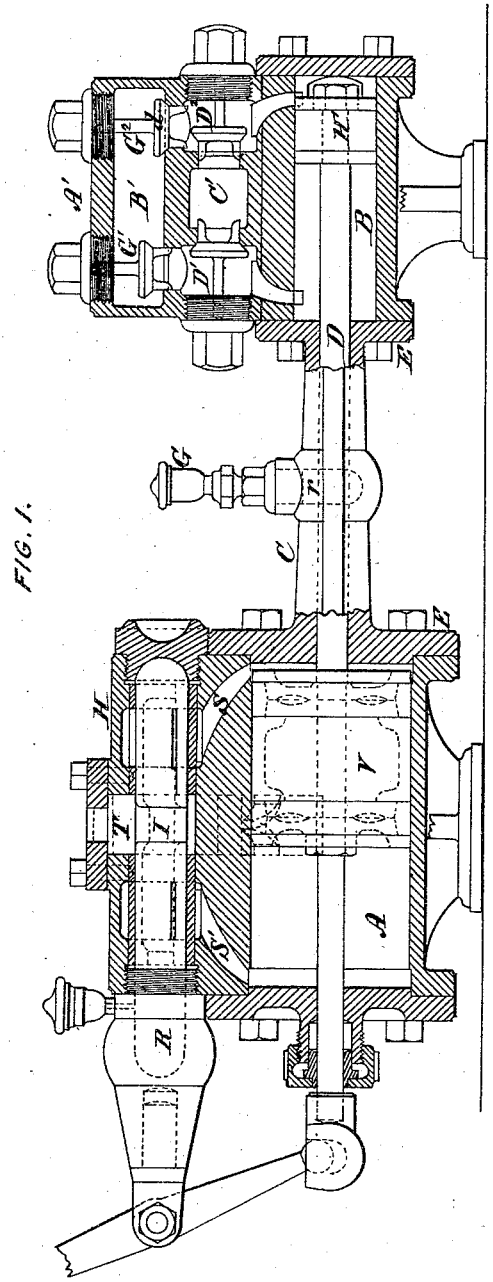
FIG. I.
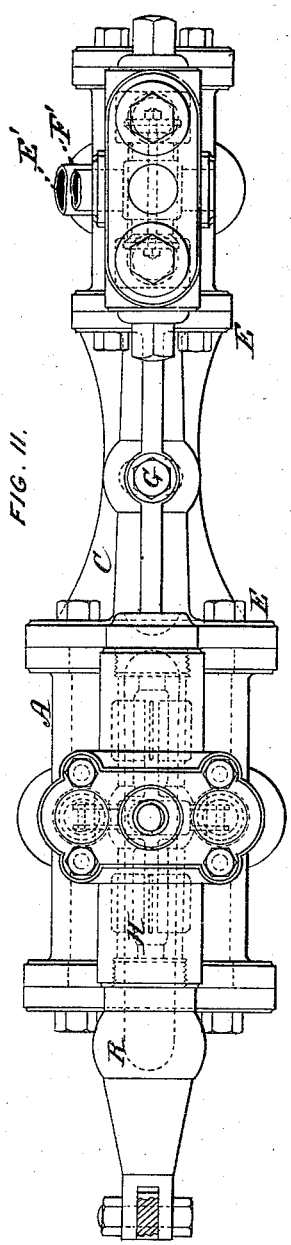
FIG. II.
WITNESSES:
A. H. Norris,
Geo W Cushing
INVENTOR:
John North.
By James L. Norris.
Atty.